US011544983B1

(12) United States Patent
Salter et al.

(10) Patent No.: US 11,544,983 B1
(45) Date of Patent: Jan. 3, 2023

(54) SYSTEM AND METHOD TO AUTHORIZE THE USE OF A BEV CHARGING APPARATUS BY A SHORT-TERM RENTER

(71) Applicant: Ford Global Technologies, LLC, Dearborn, MI (US)

(72) Inventors: Stuart C. Salter, White Lake, MI (US); Pietro Buttolo, Dearborn Heights, MI (US); Annette Lynn Huebner, Highland, MI (US); David Kennedy, Dearborn, MI (US); Hussein Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/490,839

(22) Filed: Sep. 30, 2021

(51) Int. Cl.
*G07C 9/22* (2020.01)
*G07C 9/00* (2020.01)

(52) U.S. Cl.
CPC ........... *G07C 9/22* (2020.01); *G07C 9/00309* (2013.01); *G07C 2009/00412* (2013.01); *G07C 2009/00928* (2013.01); *G07C 2209/08* (2013.01)

(58) Field of Classification Search
None
See application file for complete search history.

(56) References Cited

U.S. PATENT DOCUMENTS

| 9,751,416 | B2* | 9/2017 | Hafner | B60L 53/68 |
| 9,779,365 | B2 | 10/2017 | Smullin et al. | |
| 9,802,495 | B2* | 10/2017 | Sun | B60L 53/62 |
| 10,814,737 | B2* | 10/2020 | Sun | G01R 31/392 |
| 10,857,902 | B2 | 12/2020 | Goei et al. | |
| 2009/0313033 | A1* | 12/2009 | Hafner | B60L 53/65 705/1.1 |
| 2009/0313034 | A1* | 12/2009 | Ferro | B60L 53/665 705/1.1 |
| 2009/0313174 | A1* | 12/2009 | Hafner | B60L 53/62 705/80 |

(Continued)

FOREIGN PATENT DOCUMENTS

WO WO-2017079812 A1 * 5/2017

OTHER PUBLICATIONS

Mohd., et al., "Smart Electric Vehicle Charging Through Cloud Monitoring and Management", Technol Econ Smart Grids Sustain Energy (2017) 2:8 (10 pages).

Primary Examiner — Carlos Garcia
(74) Attorney, Agent, or Firm — Brandon Hicks; Eversheds Sutherland (US) LLP

(57) ABSTRACT

The disclosure generally pertains to systems and methods for authorizing the use of a battery electric vehicle (BEV) charging apparatus by a short-term renter. In an example method, a processor provides an authorization for use of a BEV charging apparatus by a first individual. The BEV charging apparatus is located on the premises of a building. The processor further enables access to the BEV charging apparatus over a designated period of time for use by the first individual and configures a first lock to prevent unauthorized entry by the first individual into a first portion of the building. In one scenario, the first individual is a short-term renter, the BEV charging apparatus is located in a garage of the building, the first portion of the building is a first room of the building, and the first lock is installed in a door leading into the first room of the building.

14 Claims, 7 Drawing Sheets

(56) References Cited

U.S. PATENT DOCUMENTS

| | | | |
|---|---|---|---|
| 2010/0274656 A1* | 10/2010 | Genschel | B60L 53/80 |
| | | | 705/14.27 |
| 2013/0179383 A1* | 7/2013 | Pringle | G06N 5/02 |
| | | | 320/109 |
| 2014/0214516 A1* | 7/2014 | Genschel | B60L 53/14 |
| | | | 705/14.27 |
| 2015/0202975 A1 | 7/2015 | Solomon et al. | |
| 2016/0052409 A1* | 2/2016 | Sun | B60L 53/62 |
| | | | 320/109 |
| 2018/0009322 A1* | 1/2018 | Sun | B60L 53/62 |
| 2019/0351783 A1 | 11/2019 | Goei et al. | |
| 2021/0197682 A1* | 7/2021 | Goei | B60L 53/305 |

* cited by examiner

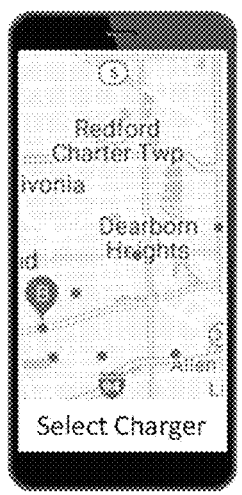
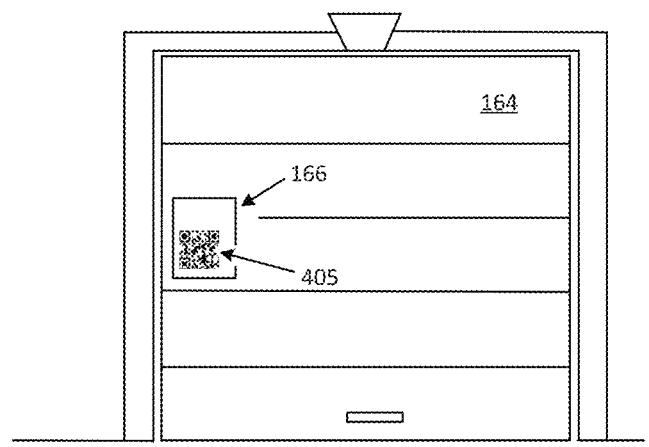
FIG. 3
FIG. 4

US 11,544,983 B1

SYSTEM AND METHOD TO AUTHORIZE THE USE OF A BEV CHARGING APPARATUS BY A SHORT-TERM RENTER

BACKGROUND

Short-term rental arrangements for residences are popular with travelers and visitors. In some cases, a short-term renter may prefer to use a battery electric vehicle (BEV) to travel around while staying at the residence. The BEV may require the use of a battery charging station at the residence. The owner may find it acceptable for the short-term renter to use the battery charging station as long as the use of the battery charging station does not inconvenience the owner. It is therefore desirable to provide a solution that both parties find acceptable.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 shows an example screenshot that may be displayed on a smartphone of a short-term renter in accordance with an embodiment of the disclosure.

FIG. 4 shows an example implementation of a lock provided on a garage door in accordance with an embodiment of the disclosure.

DETAILED DESCRIPTION

Overview

Figure 1:
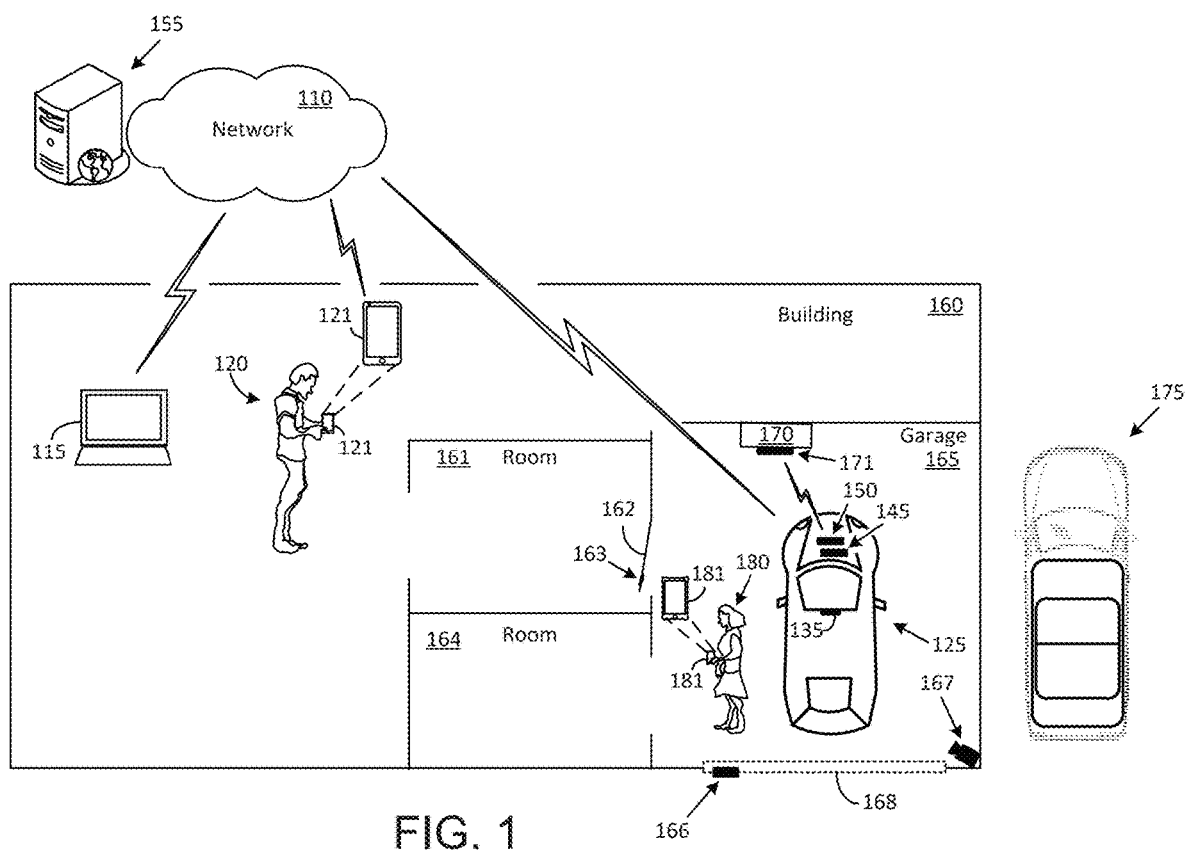
FIG. 1 illustrates an example scenario involving the use of a BEV charging apparatus by an individual who is a short-term resident of a residence in accordance with an embodiment of the disclosure.

In terms of a general overview, certain embodiments described in this disclosure are directed to systems and methods for authorizing the use of a battery electric vehicle (BEV) charging apparatus by an individual (e.g., a short-term renter). In an example method, a processor provides a first individual, an authorization to use a BEV charging apparatus that is located on the premises of a building. The processor further enables access to the BEV charging apparatus over a designated period of time for use by the first individual, and configures a first lock to prevent an unauthorized entry by the first individual into a first portion of the building. In one scenario, the BEV charging apparatus is located in a garage of the building, the first portion of the building is a first room of the building, and the first lock is installed in a door leading into the first room of the building.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the described example embodiments but should be defined only in accordance with the claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "battery electric vehicle" (BEV) must be understood to refer to any type of vehicle that operates an electric motor by use of a rechargeable battery. The word "battery" as used herein encompasses a single battery as well as a set of batteries that are interconnected to form a battery bank. The word "residence" may be used interchangeably with the word "building" and refers to any building that includes a first portion (one or more rooms, a kitchen, a bathroom, for example) that may be rented out to a short-term renter, and further includes a second portion (a room, a hallway, a floor, a basement, a living room, a kitchen, a bedroom, etc.) that is placed out-of-bounds to the short-term renter. The phrase "charging apparatus" as used herein refers to any of various types of elements used to charge a battery of a battery electric vehicle such as, for example, a battery charging station and/or an electrical power outlet located in a wall. The "charging apparatus" may provide any of various AC and/or DC voltages, including, for example, 110V AC, 220V AC, and 12V DC. The phrase "premises of a building" as used herein includes a building as well as some areas and structures surrounding the building, such as, for example, a sidewalk, a driveway, a lawn etc. The word "lease" and the word "rental" may be used interchangeably herein and should be interpreted as being equivalent to each other. It must also be understood that any description provided herein with respect to a "smartphone" is equally applicable to any other personal devices such as, for example, a tablet computer, a phablet (phone plus tablet), a wearable computer a laptop computer, etc. Thus, for example, description with respect to the smartphone 121 is equally applicable to the laptop computer 115 shown in FIG. 1. The word "owner" as used herein is equally applicable to any other entity who is authorized to issue/manage/authorize a lease agreement for a short-term lease of a portion of a building, including, for example, an agent of a rental management agency. It must also be understood that words such as "implementation," "scenario," "case," and "situation" as used herein are an abbreviated version of the phrase "In an example ("implementation," "scenario," "case," "approach," and "situation") in accordance with the disclosure." Furthermore, the word "example" as used herein is intended to be non-exclusionary and non-limiting in nature.

FIG. 1 illustrates an example scenario involving the use of a BEV charging apparatus 170 by an individual 180 who is a short-term resident of a residence in accordance with an embodiment of the disclosure. The residence in this example is a building 160 that includes a garage 165 and one or more rooms such as, for example, a room 161 and a room 164. In other scenarios, the residence can be any building that houses people who stay in the building for a temporary period of time based on a rental agreement, a lease agreement, or any other form of agreement.

In the illustrated scenario, the room 164 has been rented to the individual 180 in an arrangement that may be similar to one offered by Airbnb®, for example. The individual 120 may be any individual who is authorized to issue the lease agreement for a short-term rental of the room 164 to the individual 180, such as, for example, an owner of the building 160 or an agent of a rental management agency. The lease agreement specifies a period of time over which the individual 180 can stay in the room 164 (three days, for example) and further specifies that the individual 180 is prohibited from entering certain parts of the building 160 such as, for example, a hallway, a floor, a basement, a living room, a kitchen, and/or a bedroom. More particularly, the lease agreement specifies that the individual 180 is prohibited from entering the room 161 through a door 162 in the garage 165. The room 161 may lead into other parts of the building 160. The lease agreement may also specify certain objects that are prohibited for use by the individual 180, such as, for example, a cabinet in the garage 165, a toolchest in the garage 165, and/or a locker in the garage 165. In another scenario, the lease agreement may specify a period of time over which the individual 180 can stay in any of multiple rooms of the building 160 (or the entire building 160) but is prohibited from entering some designated areas of the building 160 and/or accessing some designated objects present in the building 160 (a cabinet, a storage container, a closet, etc.).

The short-term rental arrangement may be initiated, executed, and overseen by the use of one or more devices such as, for example, a smartphone 121, a laptop computer 115, and/or a desktop computer (not shown) associated with the individual 120, and a smartphone 181, a laptop computer (not shown), and/or a desktop computer (not shown) associated with the individual 180. Communications between the various devices (as well as with a cloud computer 155, in some scenarios) may be carried out through a network 110. In some cases, the cloud computer 155 can be a server computer configured to provide services to client devices such as the smartphone 121, the smartphone 181, and/or the laptop computer 115.

The network 110 may include any one, or a combination of networks, such as, for example, a local area network (LAN), a wide area network (WAN), a telephone network, a cellular network, a cable network, a wireless network, and/or private/public networks such as the Internet. The network 110 may support any of various communication technologies such as, for example, Wi-Fi, Wi-Fi direct, Ultra-Wideband (UBW), cellular, machine-to-machine communication, and/or man-to-machine communication.

In an example scenario, the individual 180 has a BEV 125 that he/she intends to use during his/her stay in the building 160. The lease agreement between the individual 120 and the individual 180 includes a provision that specifies some conditions associated with the use of the BEV charging apparatus 170 located in the garage 165. One example condition pertains to a designated period of time during which the individual 180 is allowed to use the BEV charging apparatus 170 for charging a battery of the BEV 125. The designated period of time may be applicable on a repetitive basis in one scenario (such as, for example, between 6 PM and 8 PM each day over the number of days during which the individual 180 stays in the building 160) and is enforced by use of a BEV charging management system 171.

In an example implementation, the BEV charging management system 171 is a standalone device that can be attached to the BEV charging apparatus 170. In another example implementation, the BEV charging management system 171 is integrated into the BEV charging apparatus 170. In yet another implementation, some functions of the BEV charging management system 171 (which can be a standalone device or an integrated device) may be executed by the cloud computer 155. In yet another implementation, the BEV charging management system 171 can be integrated into, or communicatively coupled, to a home automation device that controls one or more devices in the building 160 such as, for example, security devices associated with a security system.

In an example scenario, the lease agreement may be originated by use of the smartphone 121 (and/or the laptop computer 115) and may be enforced via various actions executed by a processor in the BEV charging management system 171. In some cases, the actions executed by the processor in the BEV charging management system 171 can involve communications between various devices such as, for example, between the BEV charging management system 171, the smartphone 121 of the individual 120, the smartphone 181 of the individual 180, the cloud computer 155, and a BEV charger system 150 provided in the BEV 125. In one implementation, the BEV charger system 150 is a standalone unit that is installed in the BEV 125. In another implementation, the BEV charger system 150 is integrated into a vehicle computer 145 that is a part of the BEV 125.

The BEV 125 may be any of various types of vehicles such as, for example, a sedan, a sports utility vehicle, a truck, a van, a minibus, a driver-operated vehicle, a semi-autonomous vehicle, or an autonomous vehicle. In the illustrated example, the BEV 125 is operated by the individual 180. In another example, the BEV 125 is an autonomous vehicle. The BEV 125 can include components such as, for example, the BEV charger system 150, a vehicle computer 145, an infotainment system 135, and various sensors and detection devices.

The vehicle computer 145 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

In the illustrated scenario, the BEV charger system 150 is configured to execute various functions such as those associated with using the BEV charging apparatus 170 to charge a battery of the BEV 125. As a part of the configuration, the BEV charger system 150 may be communicatively coupled to the vehicle computer 145 and the infotainment system 135 via wired and/or wireless connections. More particularly, in one implementation, the BEV charger system 150 is communicatively coupled to the vehicle computer 145 and the infotainment system 135 via a vehicle bus that uses a controller area network (CAN) bus protocol, a Media Oriented Systems Transport (MOST) bus protocol, and/or a CAN flexible data (CAN-FD) bus protocol. In another implementation, the communications may be provided via wireless technologies such as Bluetooth®, Ultra-Wideband (UWB), cellular, Wi-Fi, Zigbee®, or near-field-communications (NFC).

The infotainment system 135 can include elements such as, for example, a radio, an MP3 player, a global positioning system (GPS) device, a clock, and a display screen. The infotainment system 135 can further include a graphical user interface (GUI) or a human machine interface (HMI) that is displayed on the display screen. The GUI or HMI accepts input from an occupant of the BEV 125 (the individual 180, for example), and/or displays various items pertaining to battery charging operations such as, for example, messages, advisories, directives and/or warnings. An example item that may be displayed on the display screen of the infotainment system 135 can be information such as a designated period of time during which the battery in the BEV 125 can be charged.

The BEV charger system 150 may be configured to communicate directly (and/or via the network 110) with various devices such as, for example, the smartphone 121 of the individual 120, the smartphone 181 of the individual 180, the BEV charging apparatus 170, and/or the BEV charging management system 171. The communications may be carried out using a cellular communications format, WiFi, or any of various other communication formats.

The BEV 125 may include various sensors and detection devices that are communicatively coupled to the BEV charger system 150 and/or the vehicle computer 145. A few examples of such sensors and detection devices may include a camera, an ultrasonic sensor, a radar sensor, a global positioning system (GPS), a battery charge level sensor, a vehicle speed sensor, and/or a vehicle locator device. the sensors and detector devise may be used for a variety of purposes including to position the BEV 125 in the garage 165 in a manner that allows charging of the battery of the BEV 125 by the BEV charging apparatus 170.

The BEV charging apparatus 170 may be located on a wall of the garage 165 and can include the BEV charging management system 171 either in the form of a plug-in device or as an integrated device that may be a part of a battery charging station. In an example implementation, the BEV charging management system 171 includes circuitry that allows the BEV charging management system 171 to communicate with various devices such as, for example, the BEV charger system 150 in the BEV 125, the vehicle computer 145 in the BEV 125, the smartphone 181 of the individual 180, and the smartphone 121 of the individual 120. The communication can pertain to various aspects associated with charging the battery of the BEV 125.

The garage 165 includes a garage door 168, a first doorway that allows the individual 180 to enter the room 164, and a second doorway that leads into the room 161 that is out-of-bounds to the individual 180. The garage door 168 may include a lock 166 configured to allow the individual 180 to enter the garage 165 subject to authentication. In one scenario, the lock 166 may include a keypad that may be used by the individual 180 to enter a code for entering the garage 165. In another scenario, the lock 166 is an automatic lock that can be controlled via wireless signals transmitted by a remote-control device operated by the individual 180. In yet another scenario, the lock 166 may incorporate security features such as a barcode or a QR code that may be operated by use of the smartphone 181 of the individual 180.

A door 162 having a computer-activatable lock 163 is provided in the second doorway to the room 161. The computer-activatable lock 163 can be controlled by use of the smartphone 121, for example, by the individual 120 whenever the individual 120 opts to enter the room 161 from the garage 165. The computer-activatable lock 163 may remain in a locked state at other times. A camera 167 is provided in the garage 165 and used to monitor any activity taking place in the garage 165. Images and/or video streams captured by the camera 167 may be conveyed to the smartphone 121 and the individual 120 can monitor the images for various reasons, including in order to ensure that the individual 180 is not attempting to enter the room 161.

Locks that operate substantially similar to the computer-activatable lock 163 may be provided on other objects that are prohibited for use by the individual 180, such as, for example, a cabinet in the garage 165, a toolchest in the garage 165, and/or a locker in the garage 165.

The individual 120 may own a vehicle 175 that can be left parked inside the garage 165 at some times and parked outside the garage 165 at some other times. For example, the vehicle 175 can be left parked inside the garage 165 when the individual 180 does not have a vehicle or opts not to use the garage 165. In another situation, the vehicle 175 may be pulled out of the garage 165 and parked outside (on a driveway, for example) so as to allow the individual 180 to charge the battery of the BEV 125 during the designated period of time.

Figure 2:
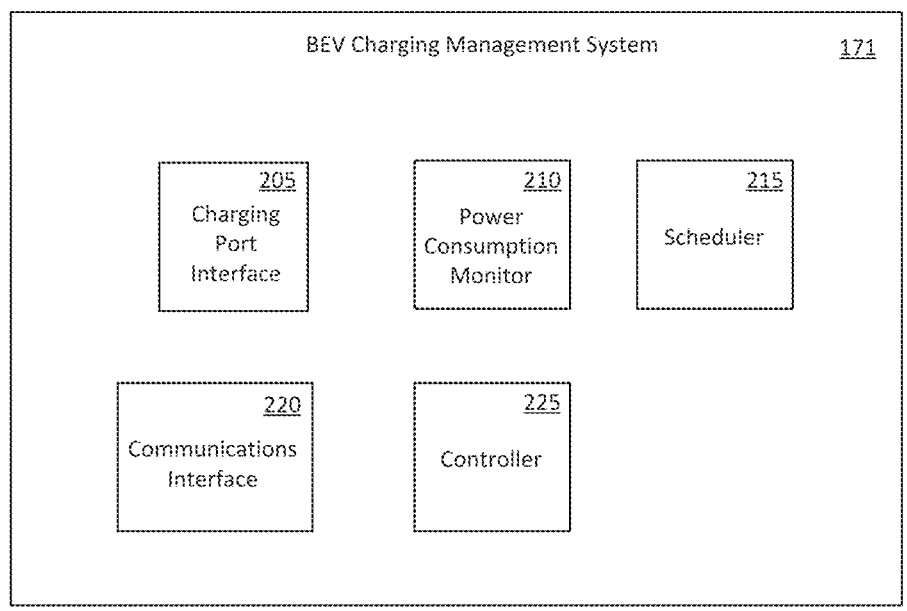
FIG. 2 shows a few example components of a BEV charging management system in accordance with an embodiment of the disclosure.

FIG. 2 shows a few example components of the BEV charging management system 171 in accordance with an embodiment of the disclosure. The example components may include a charging port interface 205, a power consumption monitor 210, a scheduler 215, a communications interface 220, and a controller 225. In an example implementation, the charging port interface 205 allows coupling of the BEV charging management system 171 to the BEV charging apparatus 170. The BEV charging apparatus 170 can be a device that provides electrical power at any one or more of various voltages (12V DC, for example) for charging a battery of the BEV 125.

In another example implementation, the charging port interface 205 allows coupling of the BEV charging management system 171 to an electrical outlet on a wall of the garage 165 (220V AC outlet, for example). In this implementation, the charging port interface 205 or the BEV charging management system 171 may include an AC-to-DC voltage converter that converts the AC voltage provided by the electrical outlet to a DC voltage (12V DC, for example) that can be used to charge a battery of the BEV 125. The charging port interface 205 may also include circuitry that routes the charging voltage from the BEV charging apparatus 170 (or electrical outlet in the wall) to a connector, a plug, or a cable that may be used by the individual 180 to couple the BEV charging apparatus 170 (via the BEV charging management system 171) to a charging port of the BEV 125. An example plug that may be included in the BEV charging management system 171 for this purpose may be, for example, a Type 1 plug, a Type 2 plug, a CCS Combo T1 plug, a CCS Combo T2 plug, a Tesla® plug, and/or a CHAdeMO plug.

The power consumption monitor 210 may include a power meter that measures an amount of power drawn from the BEV charging apparatus 170 (or the electrical wall outlet). The power consumption monitor 210 may also include a timer that measures an amount of time over which electrical charge is drawn from the BEV charging apparatus 170 (or the electrical wall outlet). The amount of power drawn and the period of time over which the power is drawn may be used by the controller 225 to calculate power consumption in the form of kilo-watt hours (kWh). The power consumption may be used to calculate a fee that is charged to the individual 180 for use of the BEV charging apparatus 170. The fee may be specified in the lease agreement for the short-term rental of the room 164 to the individual 180.

The scheduler 215 may include hardware and/or software configured to enforce use of the BEV charging apparatus 170 (or the electrical wall outlet) during the designated period of time that is specified in the lease agreement. The hardware may include, for example, components such as switches, relays, and sensors that control the flow of electrical power from the BEV charging apparatus 170 (or the electrical wall outlet) to the charging port interface 205. The hardware may be controlled by software that can be executed by a processor in the controller 225. In an example implementation, the software operates the hardware to allow flow of electrical power from the BEV charging apparatus 170 (or the electrical wall outlet) to the charging port interface 205 during the designated time period indicated in the lease agreement subject to authentication of a request from the individual 180 (via the smartphone 181 and/or the BEV charger system 150 and verification of the designated time period in the lease agreement. The lease agreement may be stored in a database in the controller 225 and/or elsewhere (such as, for example, in the cloud computer 155).

The communications interface 220 can include components such as, for example, a wireless transceiver, that enable communications between the BEV charging management system 171 and various devices such as, for example, the smartphone 181 of the individual 180, the smartphone 121 of the individual 120, and the BEV charger system 150 provided in the BEV 125. The communications interface 220 may support various communication protocols such as, for example, WiFi, Bluetooth®, Ultra-Wideband (UWB), cellular, Wi-Fi, Zigbee®, and/or near-field-communications (NFC).

The controller 225 cooperates with the components in the BEV charging management system 171 and with devices such as the smartphone 121, the smartphone 181, and the BEV charger system 150 to execute various operations in accordance with disclosure. Further details about the controller 225 are provided below.

FIG. 3 shows an example screenshot that may be displayed on the smartphone 181 of the individual 180 in accordance with the disclosure. The screenshot may be displayed by executing a software application in the smartphone 181. An example software application that may be adapted to operate in accordance with disclosure is a Ford-Pass® software application from Ford Motor Company. The individual 180 may execute the software application to obtain information such as, for example, the designated time period during which the BEV charging apparatus 170 can be used to charge the battery of the BEV 125, off-limit areas and/or objects in the building 160, contact information of the individual 120, and the lease agreement. In the illustrated example, the screenshot is a GPS display that indicates a location of the building 160.

FIG. 4 shows an example implementation of the lock 166 provided on the garage door 168. The lock 166 can be operated to grant the individual 180 entry to the garage 165 subject to authentication. In the illustrated implementation, the lock 166 is provided in the form of a QR code 405 that can be scanned by use of the smartphone 181 by the individual 180. A software application in the smartphone 181 may recognize the QR code 405 and display an authentication screen for entry of authentication credentials by the individual 180. The individual 180 may provide authentication information (pass code, password, etc.) via the authentication screen. In an example scenario, the smartphone 181 may communicate with the BEV charging management system 171 as a part of execution of the authentication procedure. If authenticated, a wireless signal may be sent from the smartphone 181 to a garage door opener mechanism that operates the garage door 168. The individual 120 who is the owner of the building 160 may define a period of time over which the authentication procedure is valid and may configure the smartphone 121 and/or the BEV charging management system 171 to disable the functionality of the QR code 405 and/or terminate the authentication procedure upon expiry of the lease period.

In another implementation, the lock 166 may be provided in the form of a wireless transceiver configured to communicate with the smartphone 181 of the individual 180. The communication can include an automatic authentication procedure that is executed when the individual 180 is in the vicinity of the garage 165. Upon successful completion of the automatic authentication procedure, the individual 180 may touch an icon on the smartphone 181 (or depress a button provided on the garage door 168 or elsewhere) to operate the garage door 168. The individual 120 who is the owner of the building 160 may define a period of time over which the automatic authentication procedure is valid and may configure the smartphone 121 and/or the BEV charging management system 171 to terminate the authentication procedure upon expiry of the lease period.

Figure 5:
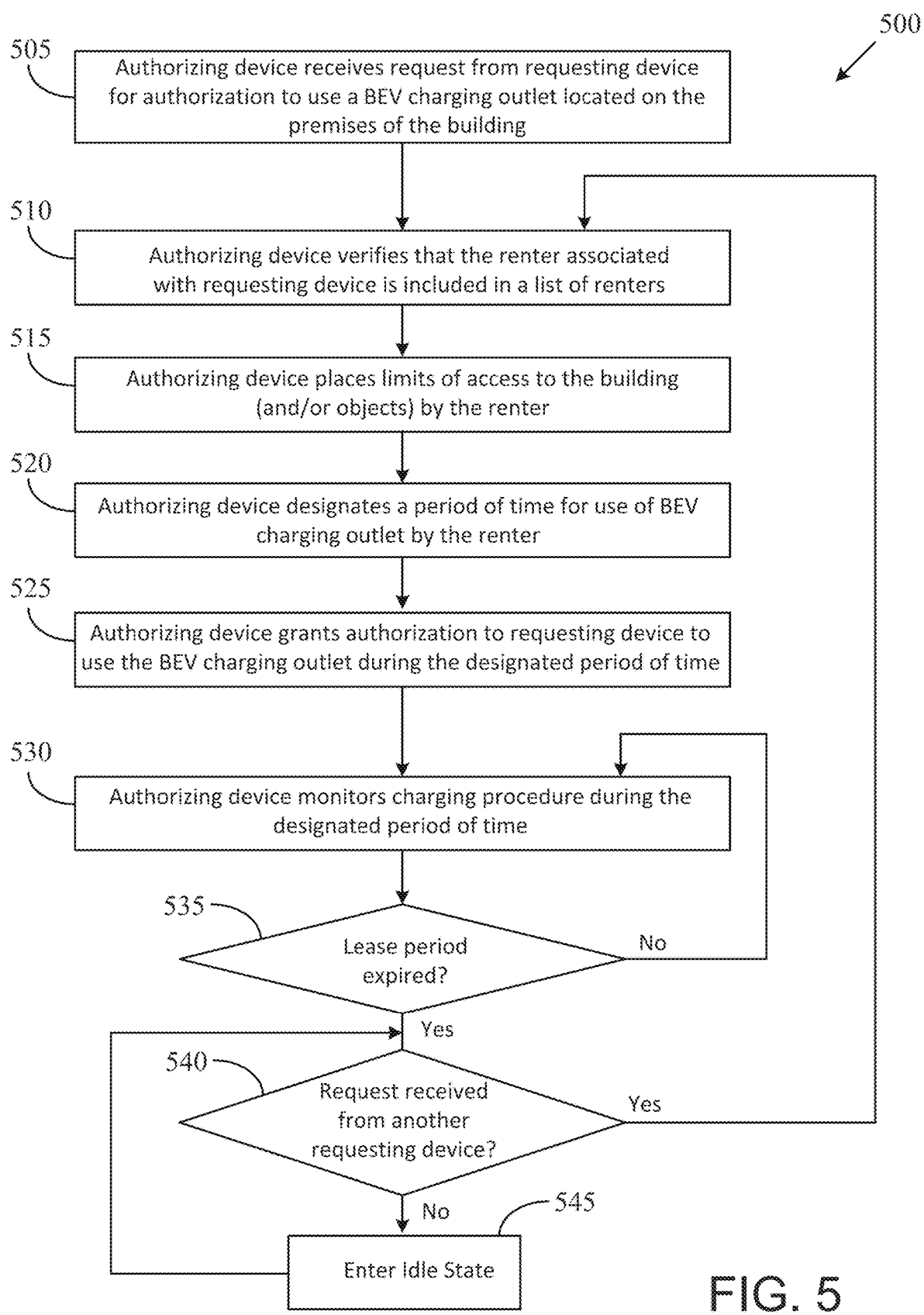
FIG. 5 shows a flowchart of an example method to arrange for the use of the BEV charging apparatus by a short-term renter of a building in accordance with an embodiment of the disclosure.

FIG. 5 shows a flowchart 500 of an example method to arrange for the use of the BEV charging apparatus 170 by the individual 180 who is a short-term renter in the building 160. The flowchart 500 illustrates a sequence of operations that can be implemented in hardware, software, or a combination thereof. In the context of software, the operations represent computer-executable instructions stored on one or more non-transitory computer-readable media such as a memory that is a part of the smartphone 121 and/or a memory that is a part of the smartphone 181, that, when executed by one or more processors such as a processor that is a part of the smartphone 121 and/or a processor that is a part of the smartphone 181, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The description below may make reference to certain components and objects shown in FIG. 1, but it should be understood that the description is equally applicable to various other components and embodiments.

At block 505, an authorizing device receives a request from a requesting device for authorization to use a BEV battery charging apparatus located on the premises of a building. In an example scenario, the authorizing device is the smartphone 121 (or the laptop computer 115) of the individual 120 who is the owner of the building 160 and the requesting device is the smartphone 181 of the individual 180 who is a short-term renter of the building 160. The authorizing device can include a processor that can access a database in which a lease agreement is stored. In some cases, the lease agreement may be stored elsewhere such as, for example, in the cloud computer 155 that is accessible by the authorizing device.

At block 510, the authorizing device verifies that the short-term renter is included in a list of renters associated with renting the building. In the example scenario, the short-term renter is the individual 180 who may be renting the building 160 for a period of time (three days, for example). The list of renters may include other short-term renters who are scheduled to rent the building 160 over other periods of time. The list of renters may be stored in a database of the smartphone 121 (or in the cloud computer 155).

At block 515, the authorizing device places limits of access to certain parts of the building 160 and/or upon objects such as, for example, a cabinet in the garage 165, a toolchest in the garage 165, and/or a locker in the garage 165. In an example operation, the smartphone 121 may be used by the individual 120 to activate the computer-activatable lock 163 to prevent the individual 180 from entering the room 161 through the door 162 in the garage 165. Details pertaining to the limiting of access may be determined by the individual 120 and recorded in the lease agreement that is accepted and signed by the individual 180.

At block 520, the authorizing device designates a period of time for use of the BEV charging apparatus 170 by the individual 180. The period of time may extend over the duration of the rental by the individual 180 and certain hours may be allocated by the individual 120 for use of BEV charging apparatus 170 by the individual 180. In an example scenario, the individual 120 may be an officegoer who prefers to charge his/her vehicle 175 (a BEV) overnight. Another member of the family of the individual 120 (a son, for example) may use the charger at any time prior to noon before heading out to school. Based on such usage, the individual 120 may decide to designate a period of time extending from 1 PM to 5 PM for use of the BEV charging apparatus 170 by the individual 180. The designated time can be entered into the smartphone 121 and included in the lease agreement.

At block 525, the authorizing device grants authorization to the requesting device to use the BEV charging apparatus 170 over the designated period of time. The authorization may be granted in various ways. In one example scenario, the authorization may be granted automatically based on communications between the smartphone 121 and the smartphone 181. In another example scenario, the authorization may be granted via oral and/or written communications between the individual 120 and the individual 180.

At block 530, the BEV charging management system 171 may monitor a charging procedure when executed during the designated period of time. Various components that may be used for this purpose can include components inside the BEV charging management system 171 (power consumption monitor 210, scheduler 215, etc.) and components located outside the BEV charging management system 171 (the camera 167, for example). The camera 167 may also be used to monitor for suspicious activity such as, for example, an attempt made by the individual 180 to enter the room 161 or cause damage to any item located inside the garage 165.

At block 535 a determination is made whether the lease of the individual 180 has expired. The determination may be carried out by the smartphone 121 based on the contents of the lease agreement (short-term rental for 3 days, for example). If the lease has not expired, at block 530, the BEV charging management system 171 continues to monitor the charging procedure.

As a part of the monitoring process, the BEV charging management system 171 may communicate with the smartphone 121 (the authorizing device) to access information that may be included in the lease agreement or communicated to the smartphone 121 by the smartphone 181. Information communicated from the smartphone 181 to the smartphone 121 (and/or to the BEV charging management system 171) can include, for example, a desired level of charging requested by the individual 180 (full charging or partial charging of the battery of the BEV 125), a length of charging time stipulated by the individual 180 (for example, 2 hours inside the designated time period of 6 hours), or an amount of money stipulated by the individual 180 towards charging fees ($20, for example).

In an example implementation, the BEV charging management system 171 may determine that the charging procedure is nearing completion such as, for example, approaching a desired level of charge (5% remaining, for example) or approaching the end of the stipulated charging time (10 minutes remaining, for example). At this time, the BEV charging management system 171 may communicate with the smartphone 181 to provide an alert to the individual 180 (via text, email, pop-up icon, etc.).

In another example implementation, a software application in the smartphone 181 (such as, for example, a FordPass® software application from Ford Motor Company) may automatically execute financial transactions related to the charging operation, such as, for example, withdrawing money from a designated bank account of the individual 180 or charging a credit card belonging to the individual 180 upon completion of the charging operation.

If, at block 535, it is determined that the lease has expired, at block 540, a determination is made whether a request has been received from another requesting device (a smartphone owned by the next short-term renter of the building 160, for example). If no request has been received, the BEV charging management system 171 may enter an idle state 545 and await a request.

Figure 6:
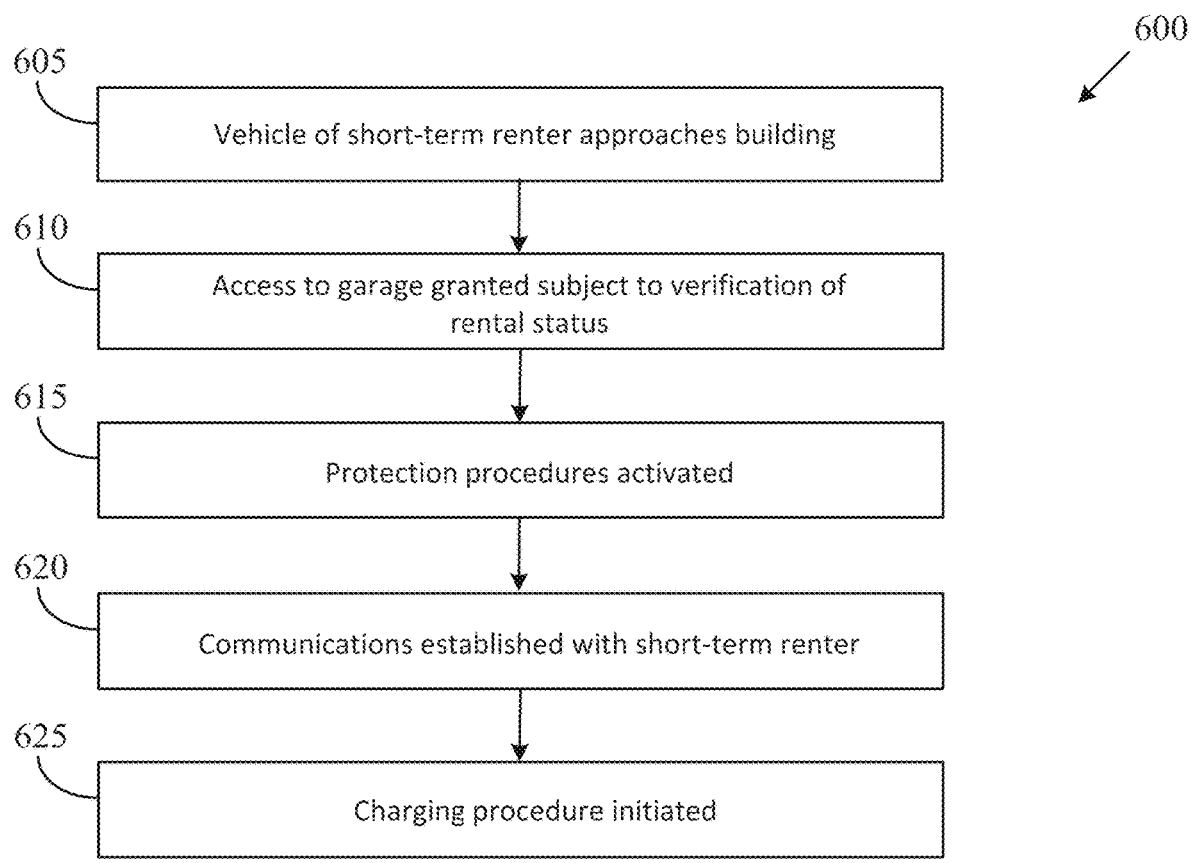
FIG. 6 shows a flowchart of another example method to arrange for the use of the BEV charging apparatus by a short-term renter of a building in accordance with an embodiment of the disclosure.

FIG. 6 shows a flowchart 600 of another example method to arrange for the use of the BEV charging apparatus 170 by the individual 180 who is a short-term renter of the building 160. At block 605, the BEV 125 of the individual 120 approaches the garage 165. A sensing device such as, for example, a camera mounted outside and above the door of the garage 165, may detect the BEV 125 and convey information (image, sensor signal etc.) to the smartphone 121 of the individual 120 and/or the BEV charging management system 171.

At block 610, the smartphone 121 and/or the BEV charging management system 171 may communicate with the smartphone 181 of the individual 180 and/or the BEV charger system 150 in the BEV 125 to obtain identification information for verifying a rental status of the individual 180. In an example scenario, the communications may involve an encryption key exchange procedure that may be facilitated via the QR code 405 in the lock 166 on the garage door 168 or via other security configurations. If the rental status of the individual 180 is valid, access to the garage 165 is granted.

At block 615, upon grant of access to the individual 180, the smartphone 121 and/or the BEV charging management system 171 may communicate with various devices in the building 160 such as, for example, a home automation system, a security system (the camera 167), and the computer-activatable lock 163 to activate protection procedures. The protection procedures may include activating the computer-activatable lock 163 and other such actions to ensure that the individual 180 is prevented access to the room 161 and tampering with various objects that may be present in the garage 165. In an example scenario, a camera provided in the BEV 125 may capture images and/or generate a video stream that may be conveyed to the smartphone 121. The individual 120 may peruse the images and/or watch the video stream in real time to observe actions performed by the BEV 125 and/or the individual 180 while inside the garage 165. The images and/or video stream may also be conveyed to the cloud computer 155 for storage and/or evaluation. Evaluation of the images and/or video stream may include techniques such as, for example, machine learning and artificial intelligence.

At block 620, communications may be established between the smartphone 121 of the individual 120 and the smartphone 181 of the individual 180 (and/or the infotainment system 135 in the BEV 125). In an example scenario, the communications may be initiated by either the individual 120 or the individual 180 for various reasons. In one example situation, the individual 180 may be unfamiliar with the BEV charging apparatus 170 provided inside the garage 165 and may seek the assistance of the individual 120. In another example situation, the individual 180 may communicate with the individual 120 for other reasons associated with the short-term rental of the building 160.

At block 625, a charging procedure may be initiated and executed in the manner described above with respect to the flowchart 500.

Figure 7:
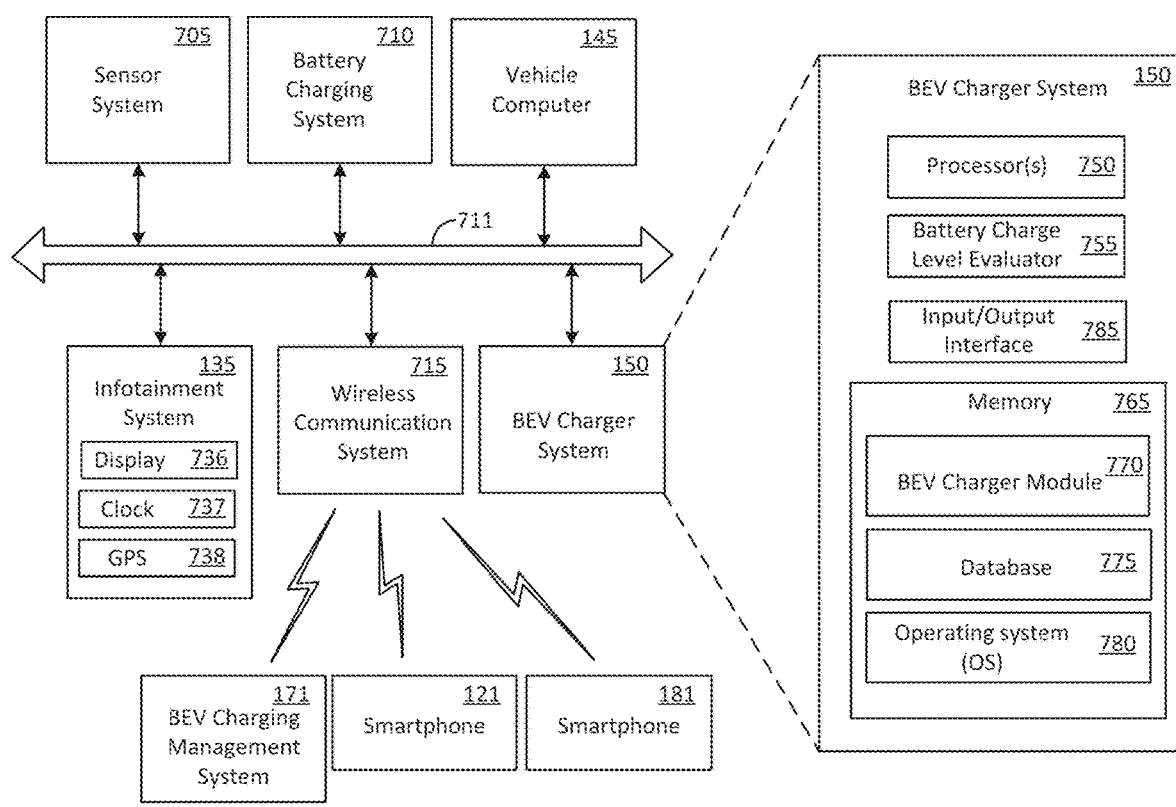
FIG. 7 shows some example components that may be provided in a BEV in accordance with an embodiment of the disclosure.

FIG. 7 shows some example components that may be provided in the BEV 125 in accordance with an embodiment of the disclosure. The example components in the BEV 125 can include a sensor system 705, a battery charging system 710, the vehicle computer 145, the infotainment system 135, a wireless communication system 715, and the BEV charger system 150, which are communicatively coupled to each other via a bus 711. The bus 711 can be implemented using one or more of various wired and/or wireless technologies. For example, the bus 711 can be a vehicle bus that uses a controller area network (CAN) bus protocol, a Media Oriented Systems Transport (MOST) bus protocol, and/or a CAN flexible data (CAN-FD) bus protocol. Some or all portions of the bus 711 may also be implemented using wireless technologies such as Bluetooth®, ZigBee®, Ultra-Wideband (UWB), near-field-communications (NFC), cellular, Wi-Fi, Wi-Fi direct, machine-to-machine communication, and/or man-to-machine communication.

The sensor system 705 may include various sensors and detection devices that are communicatively coupled to the BEV charger system 150 and/or the vehicle computer 145. A few examples of such sensors and detection devices can include a camera, an ultrasonic sensor, a radar sensor, a global positioning system (GPS), a battery charge level sensor, a vehicle speed sensor, and/or a vehicle locator device.

The battery charging system 710 can include various items such as, for example, a charging port, a voltage stabilizer, and a voltage converter (in some cases) that can be used when charging a battery of the BEV 125 from a battery charging apparatus such as the BEV charging apparatus 170.

The wireless communication system 715 may include elements such as, for example, wireless transmitters and receivers that enable communications between the BEV charger system 150 and various devices, such as, for example, the smartphone 121 of the individual 120, the smartphone 181 of the individual 180, the BEV charging management system 171, and the cloud computer 155.

The infotainment system 135 can be an integrated unit that includes various components such as, for example, a radio, an MP3 player, a display 736, a clock 737, and a GPS device 738. The display 736 may include a graphical user interface (GUI) for use by the individual 180 to observe information provided by the BEV charger system 150 such as, for example, designated periods of time for charging the battery in the BEV 125, amount of money for executing a charging procedure, and charging time.

The BEV charger system 150 may include a processor 750, a battery charge level evaluator 755, an input/output interface 785, and a memory 765. In some implementations, some or all parts of the BEV charger system 150 such as, for example, the processor 750 and the memory 765, may be incorporated into the vehicle computer 145. The memory 765, which is one example of a non-transitory computer-readable medium, may be used to store an operating system (OS) 780 and various code modules such as, for example, a BEV charger module 770. The code modules are provided in the form of computer-executable instructions that can be executed by the processor 750 for performing various operations in accordance with the disclosure. More particularly, the BEV charger module 770 may be executed by the processor 750 for performing various operations in accordance with the disclosure. Some of these operations are described above. The input/output interface 785 may be configured to support transfer of an advisory from the BEV charger system 150 to the infotainment system 135 to advise the individual 180 on various matters associated with charging the battery of the BEV 125.

In an example battery charging procedure, the processor 750 may cooperate with the battery charge level evaluator 755 to determine a level of charge in a battery of the BEV 125. The charge level information may be obtained by the battery charge level evaluator 755 from a battery charge level sensor of the sensor system 705. In an example scenario, the BEV charger system 150 may determine that a charge level of the battery in the BEV 125 has dropped below a threshold charge level and advise the individual 180 to recharge the battery.

The database 775 may be used to store various types of information such as for example, the lease agreement associated with a short-term rental of the building 160.

Figure 8:
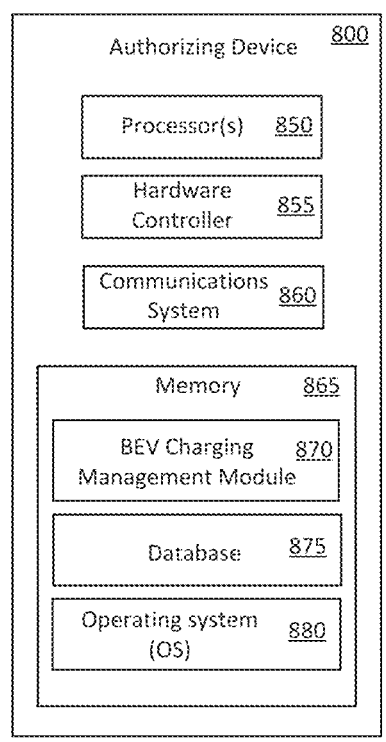
FIG. 8 shows some example components that may be provided in an authorizing device in accordance with an embodiment of the disclosure.

FIG. 8 shows some example components that may be provided in an authorizing device 800 in accordance with an embodiment of the disclosure. The authorizing device 800 can be any of various devices such as, for example, the smartphone 121 or the laptop computer 115. The example components in the authorizing device 800 can include a processor 850, a hardware controller 855, a communications system 860, and a memory 865.

The hardware controller 855 may include hardware and/or software configured to transmit control signals for controlling various devices in the building 160 such as, for example, the computer-activatable lock 163. The communications system 860 can include a transceiver that enables communications between the authorizing device 800 and various devices such as, for example, the smartphone 181 of the individual 180, the BEV charging management system 171, the BEV charger system 150, and the camera 167.

The memory 865, which is another example of a non-transitory computer-readable medium, may be used to store an operating system (OS) 880 and various code modules such as, for example, a BEV charging management module 870. The code modules are provided in the form of computer-executable instructions that can be executed by the processor 850 for performing various operations in accordance with the disclosure. More particularly, the BEV charging management module 870 may be executed by the processor 850 for performing various operations in accordance with the disclosure. Some of these operations are described above.

The database 875 may be used to store various types of information such as for example, the lease agreement associated with a short-term rental of the building 160, fees associated with use of the BEV charging apparatus 170 by short-term renters, one or more periods of time designated for use by short-term renters, and fee-collection information (credit card information, bank information etc.)

The example embodiments described above provide indication of certain features and advantages. It should be understood that there are many more features and advantages that can be effected in accordance with the disclosure. For example, the operations described above can be incentivized in various ways such as, for example, by framing the charging procedure in the context of a game (where a driver is rewarded on the basis of his/her performance) and offering credits that can be used for various purposes such as for purchasing products and/or services.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 750 or the processor 510, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 765, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
providing, by a processor, an authorization to use a battery electric vehicle (BEV) charging apparatus by a first individual, the BEV charging apparatus located on the premises of a building;
enabling, by the processor, access to the BEV charging apparatus over a designated period of time for use by the first individual; and
preventing, by the processor, unauthorized entry by the first individual into a first portion of the building.

2. The method of claim 1, wherein the BEV charging apparatus is located in a garage of the building, the first portion of the building is a first room of the building, and a lock is disposed between the garage and the first room of the building.

3. The method of claim 2, wherein authorizing the use of the BEV charging apparatus by the first individual comprises providing an encryption key for use by the first individual to open a garage door of the garage.

4. The method of claim 1, further comprising:
generating, by the processor, a list of individuals;
including, by the processor, the first individual in the list of individuals; and
providing, by the processor, to a second individual in the list of individuals, access to the BEV charging apparatus over a second period of time.

5. The method of claim 1, wherein the first individual of the BEV charging apparatus is one of a renter or a guest staying in a second portion of the building.

6. The method of claim 1, wherein the designated period of time is designated by an individual who is a resident and/or an owner of the building.

7. The method of claim 6, further comprising:
denying, by the processor, to the first individual, access to the BEV charging apparatus over a second period of time.

8. A system comprising:
an authentication module comprising:
a memory that stores computer-executable instructions; and
a processor configured to access the memory and execute the computer-executable instructions to perform operations comprising:
providing an authorization to use a battery electric vehicle (BEV) charging apparatus by a first individual, the BEV charging apparatus located on the premises of a building;
enabling access to the BEV charging apparatus over a designated period of time; and
configuring, a first lock to prevent an unauthorized entry by the first individual into a first portion of the building.

9. The system of claim 8, wherein the BEV charging apparatus is located in a garage of the building, the first portion of the building is a first room of the building, and the first lock is installed in a door leading into the first room of the building.

10. The system of claim 9, wherein authorizing the use of the BEV charging apparatus by the first individual comprises providing an encryption key for use by the first individual to open a garage door of the garage.

11. The system of claim 8, wherein the processor is configured to access the memory and execute additional computer-executable instructions to perform operations comprising:
generating a list of individuals;
including the first individual in the list of individuals; and
providing, to a second individual in the list of individuals, access to the BEV charging apparatus over a second period of time.

12. The system of claim 8, wherein the first individual of the BEV charging apparatus is one of a renter or a guest staying in a second portion of the building.

13. The system of claim 8, wherein the designated period of time is designated by an individual who is a resident and/or an owner of the building.

14. The system of claim 13, wherein the processor is configured to access the memory and execute additional computer-executable instructions to perform operations comprising:

denying access to the first individual, to the BEV charging apparatus over a second period of time.

\* \* \* \* \*